(12) United States Patent
Kawahara et al.

(10) Patent No.: US 9,197,342 B2
(45) Date of Patent: Nov. 24, 2015

(54) COMMUNICATION DEVICE, COMMUNICATION SYSTEM AND COMMUNICATION METHOD

(75) Inventors: Nobuhiro Kawahara, Tokyo (JP); Koichi Usami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 664 days.

(21) Appl. No.: 13/541,496

(22) Filed: Jul. 3, 2012

(65) Prior Publication Data

US 2013/0011135 A1    Jan. 10, 2013

(30) Foreign Application Priority Data

Jul. 4, 2011   (JP) .................................. 2011-148465

(51) Int. Cl.
*H04J 3/07*   (2006.01)
*H04J 3/16*   (2006.01)

(52) U.S. Cl.
CPC  *H04J 3/1652* (2013.01); *H04J 3/07* (2013.01)

(58) Field of Classification Search
CPC .................................. H04J 3/07; H04J 3/1652
See application file for complete search history.

(56) References Cited

U.S. PATENT DOCUMENTS

| 7,894,482 | B1 * | 2/2011 | Wu et al. | ........................ 370/476 |
| 2004/0114633 | A1 * | 6/2004 | Mallya | .......................... 370/505 |
| 2008/0075113 | A1 * | 3/2008 | Harley et al. | ................. 370/466 |
| 2008/0267223 | A1 * | 10/2008 | Meagher et al. | ............. 370/505 |
| 2010/0226648 | A1 * | 9/2010 | Katagiri et al. | ................. 398/66 |
| 2012/0302185 | A1 * | 11/2012 | Hotta et al. | .................... 455/119 |

FOREIGN PATENT DOCUMENTS

| CA | 2571262 A1 * | 6/2005 | ............... H04J 4/16 |
| EP | 2296297 A1 | 3/2011 | |
| JP | 2010212890 A | 9/2010 | |
| JP | 2010213271 A | 9/2010 | |
| WO | WO2011075901 A1 * | 6/2011 | ............. H04J 14/00 |

OTHER PUBLICATIONS

Japanese Office Action for JP Application No. 2011-148465 mailed on Apr. 21, 2015 with English Translation.
G. 709/Y.1331(Dec. 2009) Interfaces for the Optical Transport Network (OTN), Recommendation ITU-T G. 709/Y. 1331, April 23, 2011, Dec. 2009. p. 163-166.

* cited by examiner

*Primary Examiner* — Nathan Curs

(57) ABSTRACT

A communication device includes an addition unit which outputs a result of adding a predetermined number to the number of data blocks of a first signal, a comparison unit which, on the basis of comparison of the addition result with the number of data blocks of a second signal outputs the addition result of subtracting the number of data blocks of the second signal from the addition result, as a selection result, a data insertion unit which, on the basis of comparison of the selection result with the number of data blocks of the first signal, inserts either of the first signal and adjustment data into the second signal, and a storage unit which stores the selection result, and outputs the selection result stored last time to the addition unit, as the predetermined number.

12 Claims, 13 Drawing Sheets

Fig.8

| Column | 15 | 16 | 17 | 18 | ... | 3824 |
|---|---|---|---|---|---|---|
| Row 1 | | OPUk_OH | 1 | 2 | | 3808 |
| Row 2 | | | 3809 | 3810 | | 7616 |
| Row 3 | | | 7617 | 7618 | | 11424 |
| Row 4 | | | 11425 | 11426 | | 15232 |

Fig.9

| Column | 15 | 16 | 17 | 18 | 19 | 20 | | 3823 | 3824 |
|---|---|---|---|---|---|---|---|---|---|
| Row 1 | | | 1 | 1 | 2 | 2 | | 1904 | 1904 |
| Row 2 | OPUk_OH | | 1905 | 1905 | 1906 | 1906 | | 3808 | 3808 |
| Row 3 | | | 3809 | 3809 | 3810 | 3810 | | 5712 | 5712 |
| Row 4 | | | 5713 | 5713 | 5714 | 5714 | | 7616 | 7616 |

Fig.10

| Column | 15 | 16 | 17 | ... | 24 | 25 | ... | 32 | ... | 3817 | ... | 3824 |
|---|---|---|---|---|---|---|---|---|---|---|---|---|
| Row 1 | | OPUk_OH | 1 | | 1 | 2 | | 2 | | 476 | | 476 |
| Row 2 | | | 477 | | 477 | 478 | | 478 | | 952 | | 952 |
| Row 3 | | | 953 | | 953 | 954 | | 954 | | 1428 | | 1428 |
| Row 4 | | | 1429 | | 1429 | 1430 | | 1430 | | 1904 | | 1904 |

Fig. 12

| Row\Column | 15 | 16 | 17 | ... | 56 | 57 | ... | 96 | 97 | ... | 3776 | ... | 3816 | 3817...3824 |
|---|---|---|---|---|---|---|---|---|---|---|---|---|---|---|
| 1 | OPUk_OH | | 1 | | 1 | 1 | | 1 | 1 | | 48 | | 48 | Fixed Stuff |
| 2 | | | 48 | | 48 | 49 | | 49 | 49 | | 95 | | 95 | |
| 3 | | | 96 | | 96 | 96 | | 96 | 97 | | 143 | | 143 | |
| 4 | | | 143 | | 143 | 144 | | 144 | 144 | | 190 | | 190 | |

COMMUNICATION DEVICE, COMMUNICATION SYSTEM AND COMMUNICATION METHOD

This application is based upon and claims the benefit of priority from Japanese Patent Application No. 2011-148465, filed on Jul. 4, 2011, the disclosure of which is incorporated herein in its entirety by reference.

TECHNICAL FIELD

The present invention relates to a communication device, a communication system and a communication method for performing data communication on a network.

BACKGROUND ART

With an increase in traffic on a network in recent years, demand for transmission technologies for optical networks is increasing. OTN (Optical Transport Network) is mentioned as one of such technologies. OTN is a technology whose standardization has been carried out in ITU-T (International Telecommunication Union Telecommunication Standardization Sector).

In OTN, a variety of types of client signals, such as SDH (Synchronous Digital Hierarchy), SONET (Synchronous Optical Network) and Ethernet (registered trademark), which are received from an external network, can be contained and transferred.

More specifically, an edge router in OTN transmits a received client signal, adding control information including an overhead (Overhead: OH) and error correction bytes or the like to the client signal. Transmitting a received client signal by inserting it into the payload of an OTN frame is also described as "contain (or map) a client signal into the payload of an OTN frame".

In the following, description is given of a technology for containing a client signal in the payload of an OTN frame. Here, an OTN frame in this case is called an OPUk (Optical Channel Payload Unit-k). The "k" takes numerical values such as 0, 1, 2, 3 and 4, and each OPUk has a different frame structure.

When transmitting a client signal, containing it in the payload of an OPU frame, to an external network, it is necessary to reproduce the client signal from the OPU frame. Here, in order to prevent the occurrence of large variation between bits in the reproduction, it is preferable that a transfer rate at containment and that at reproduction are as equal as possible.

AMP (Asynchronous Mapping Procedure) is mentioned as one of technologies for containing a client signal. In AMP, in order to make a transfer rate of the payload in an OTN and that of a client signal almost the same with each other, insertion point of data called fixed stuff needs to be adjusted and normalized. Due to that, a problem has arisen in that AMP cannot be applied to many types of client signals. Here, the stuff is data inserted in the payload of an OPU frame so as to adjust the transfer rate.

On the other hand, GMP (Generic Mapping Procedure) is mentioned as a mapping method capable of flexibly handling a variety of types of client signals or a new client signal appearing in the future. GMP is a technology standardized as ITU-T G.709. GMP is described also in Japanese Patent Application Laid-Open No. 2010-212890 (hereinafter referred to as "patent document 1").

In GMP, it is possible to contain client data at constant interval, determining a mapping position of client data or of stuff from a ratio between a transfer rate in the OTN and that of a client signal. Because of no necessity of effort to adjust an insertion point of fixed stuff, GMP can be said to be a more flexible method than AMP method.

In GMP, a mapping position of client data or of stuff is determined using the following operational expressions.

(1) when the following condition is satisfied, client data (D) is inserted in the block number j of an OPU frame.

$$(j \times Cm(t)) \bmod Pm\_server < Cm(t);$$

(2) when the following condition is satisfied, stuff (S) is inserted in the block number j of an OPU frame.

$$(j \times Cm(t)) \bmod Pm\_server \geq Cm(t);$$

Here, definitions of the symbols are as follows.

j: payload block number,
Cm (t): the number of data blocks to be contained (the number of data blocks of a client signal),
Pm_server: the maximum value of payload block number,
mod: remainder operator.

FIG. 13 shows a configuration of a circuit which directly represents the above-described mathematical expressions. The circuit in FIG. 13 consists of a multiplication circuit 201, a division circuit 202 and a comparison/determination circuit 203. In the following, operation of the circuit in FIG. 13 will be described.

First, in the multiplication circuit 201, a multiplication j×Cm(t) is performed to obtain a multiplication result S211. The multiplication circuit 201 outputs the multiplication result S211 to the division circuit 202.

Next, in the division circuit 202, a division of the multiplication result by Pm_server is performed to obtain a remainder S212. The division circuit 202 outputs the remainder S212 to the comparison/determination circuit 203.

In the comparison/determination circuit 203, the remainder S212 is compared with Cm(t). When the remainder S212 is smaller than Cm(t), the comparison/determination circuit 203 outputs a signal S213 taking "High". When the remainder S212 is equal to or larger than Cm(t), the comparison/determination circuit 203 outputs a signal S213 taking "Lo".

The comparison/determination result obtained by the comparison/determination circuit 203 is outputted as a client data position signal which becomes control information for inserting client data when the signal is "High" or for inserting stuff when the signal is "Lo".

As described above, when implementing GMP described in patent document 1, a multiplication circuit and a division circuit are necessary. In practice, a multiplication circuit is made up of a plurality of addition circuits, and a division circuit is of a plurality of subtraction circuits. Due to that, there has been a problem in that a number of addition circuits and subtraction circuits are required and accordingly the circuit scale of a communication device necessarily becomes large.

SUMMARY

An exemplary object of the invention is to provide a communication device, a communication system, a communication method and a communications program which can solve the problem in that the circuit scale of a communication device becomes large.

A communication device according to an exemplary aspect of the invention includes an addition unit which outputs a result of adding a predetermined number to the number of data blocks of a first signal, as an addition result, a comparison unit which, on the basis of comparison of the addition result with the number of data blocks of a second signal to contain the first signal, outputs the addition result or a result of subtracting the number of data blocks of the second signal from the addition result, as a selection result, a data insertion unit which, on the basis of comparison of the selection result with the number of data blocks of the first signal, inserts either of the first signal and adjustment data into the second signal, and a storage unit which, when a data block into which the first signal or the adjustment data is to be inserted is a data area, stores the selection result, and outputs the selection result stored last time to the addition unit, as the predetermined number.

A communication system according to an exemplary aspect of the invention includes, a reception unit which receives a first signal, an addition unit which outputs a result of adding a predetermined number to the number of data blocks of the first signal, as an addition result, a comparison unit which, on the basis of comparison of the addition result with the number of data blocks of a second signal to contain the first signal, outputs the addition result or a result of subtracting the number of data blocks of the second signal from the addition result, as a selection result, a data insertion unit which, on the basis of comparison of the selection result with the number of data blocks of the first signal, inserts either of the first signal and adjustment data into the second signal, a storage unit which, when a data block into which the first signal or the adjustment data is to be inserted is a data area, stores the selection result, and outputs the selection result stored last time to the addition unit, as the predetermined number, and a transmission unit which, on the basis of the insertion result of the data insertion unit, generates and transmits the second signal.

A communication method according to an exemplary aspect of the invention includes the steps of outputting a result of adding a predetermined number to the number of data blocks of a first signal, as an addition result, outputting, on the basis of comparison of the addition result with the number of data blocks of a second signal to contain the first signal, the addition result or a result of subtracting the number of data blocks of the second signal from the addition result, as a selection result, inserting either of the first signal and adjustment data into the second signal, on the basis of comparison of the selection result with the number of data blocks of the first signal, and storing the selection result and outputting the selection result stored last time for the adding, as the predetermined number, when a data block into which the first signal or the adjustment data is to be inserted is a data area.

According to the present invention, it is possible to contain data of a first signal into a second signal without performing either multiplication or division. Accordingly, it becomes possible to reduce the circuit scale of a communication device.

BRIEF DESCRIPTION OF THE DRAWINGS

Exemplary features and advantages of the present invention will become apparent from the following detailed description when taken with the accompanying drawings in which:

FIG. 8 is a diagram showing a structure of an OPU0 frame;

FIG. 9 is a diagram showing a structure of an OPU1 frame;

FIG. 10 is a diagram showing a structure of an OPU2 frame;

FIG. 12 is a diagram showing a structure of an OPU4 frame;

EXEMPLARY EMBODIMENT

Hereinafter, exemplary embodiments of the present invention will be described with reference to drawings.

First Exemplary Embodiment

Configuration

Figure 1:
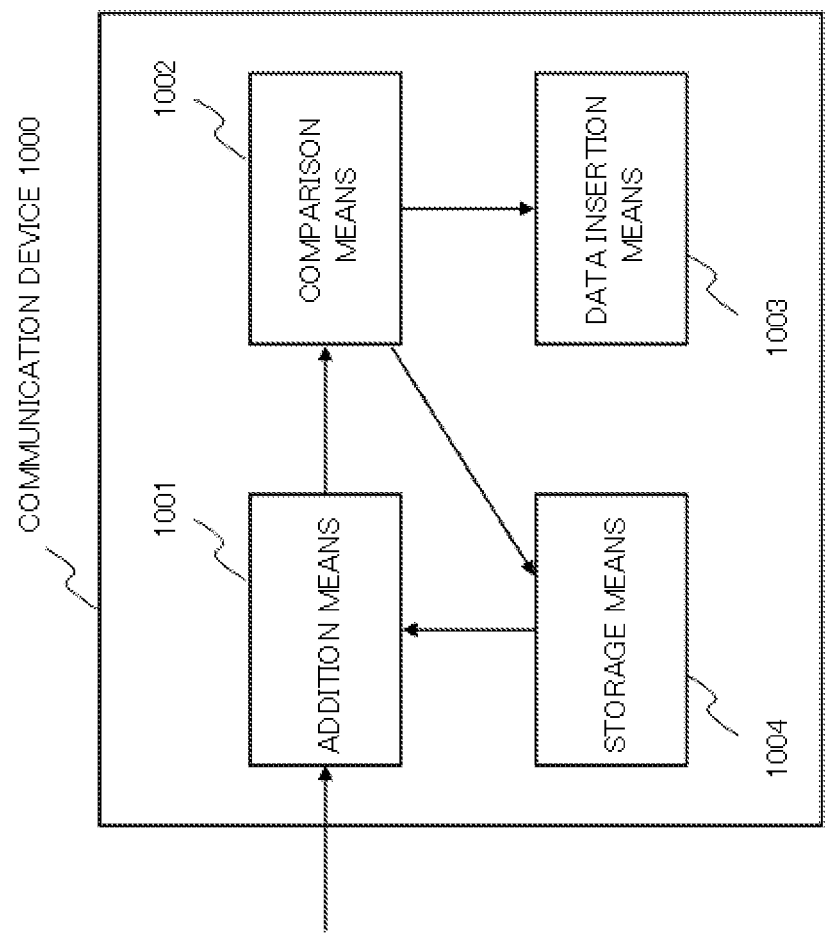
FIG. 1 is a diagram showing a configuration of a communication device according to a first exemplary embodiment.

FIG. 1 is a diagram showing a configuration of a communication device 1000 according to a first exemplary embodiment. According to FIG. 1, the communication device 1000 includes an addition means 1001, a comparison means 1002, a data insertion means 1003 and a storage means 1004.

The communication device 1000 contains a first signal it receives, into a second signal.

Operation

Figure 2:
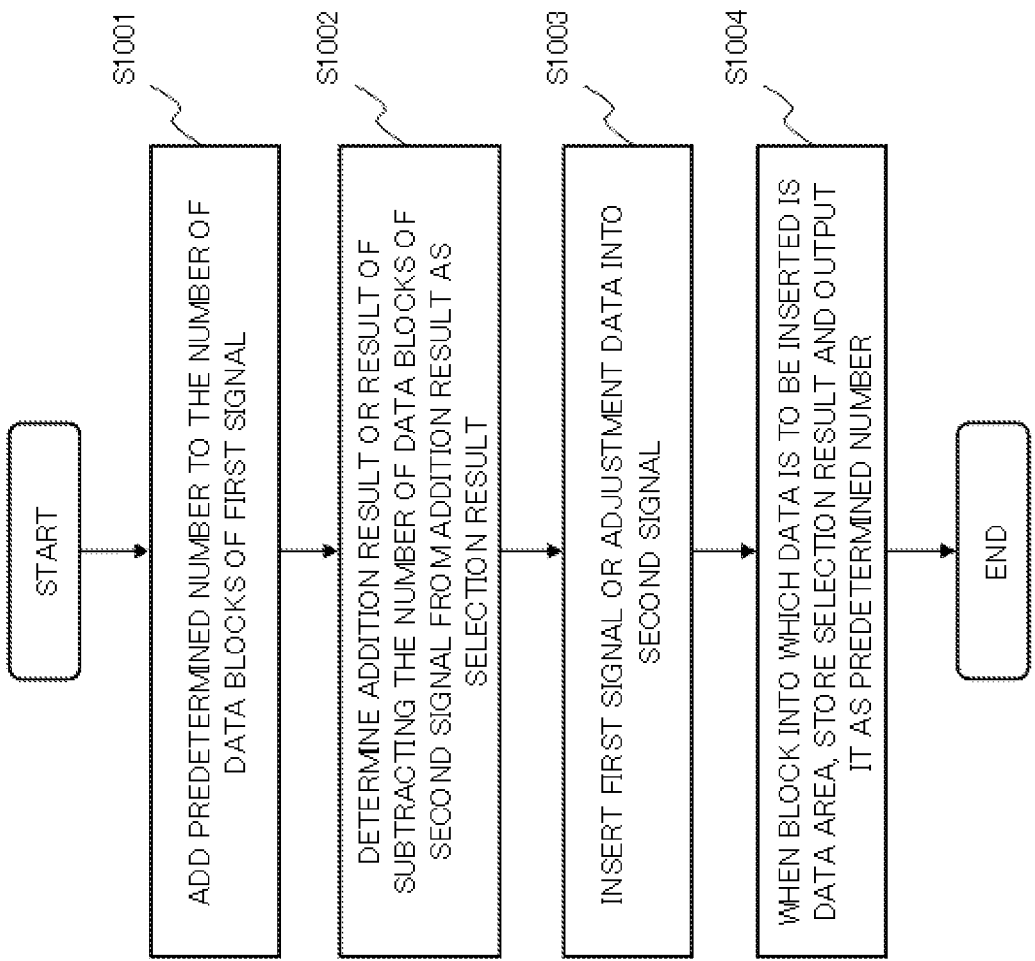
FIG. 2 is a flow chart showing operation according to the first exemplary embodiment.

Using FIG. 2, operation of the communication device 1000 will be described.

First, an addition means 1001 adds a predetermined number to the number of data blocks of a first signal (S1001).

The comparison means 1002 compares the addition result obtained by the addition means 1001 with the number of data blocks of a second signal. On the basis of the comparison result, the comparison means 1002 determines, as a selection result, either the addition result or a result of subtracting the number of data blocks of the second signal from the addition result (S1002). Further, the comparison means 1002 outputs the selection result to the storage means 1004.

Next, the data insertion means 1003 compares the selection result with the number of data blocks of the first signal. On the basis of the comparison result, the data insertion means 1003 inserts either the first signal or adjustment data into the second signal (S1003).

Subsequently, when a data block into which either of the first signal and the adjustment data is to be inserted is a data area, the storage means 1004 stores the selection result outputted from the comparison means 1002, and outputs it as a predetermined number to the addition means 1001 (S1004).

Advantageous Effect

According to the first exemplary embodiment, addition at the addition means 1001 and subtraction at the comparison means 1002 are each performed once, and on the basis of the result, a type of data to be inserted is determined.

As a result, according to the first exemplary embodiment, it is possible to contain data of the first signal into the second signal without performing any multiplication or division. Accordingly, reduction of the circuit scale becomes possible.

Second Exemplary Embodiment

Configuration

Figure 3:
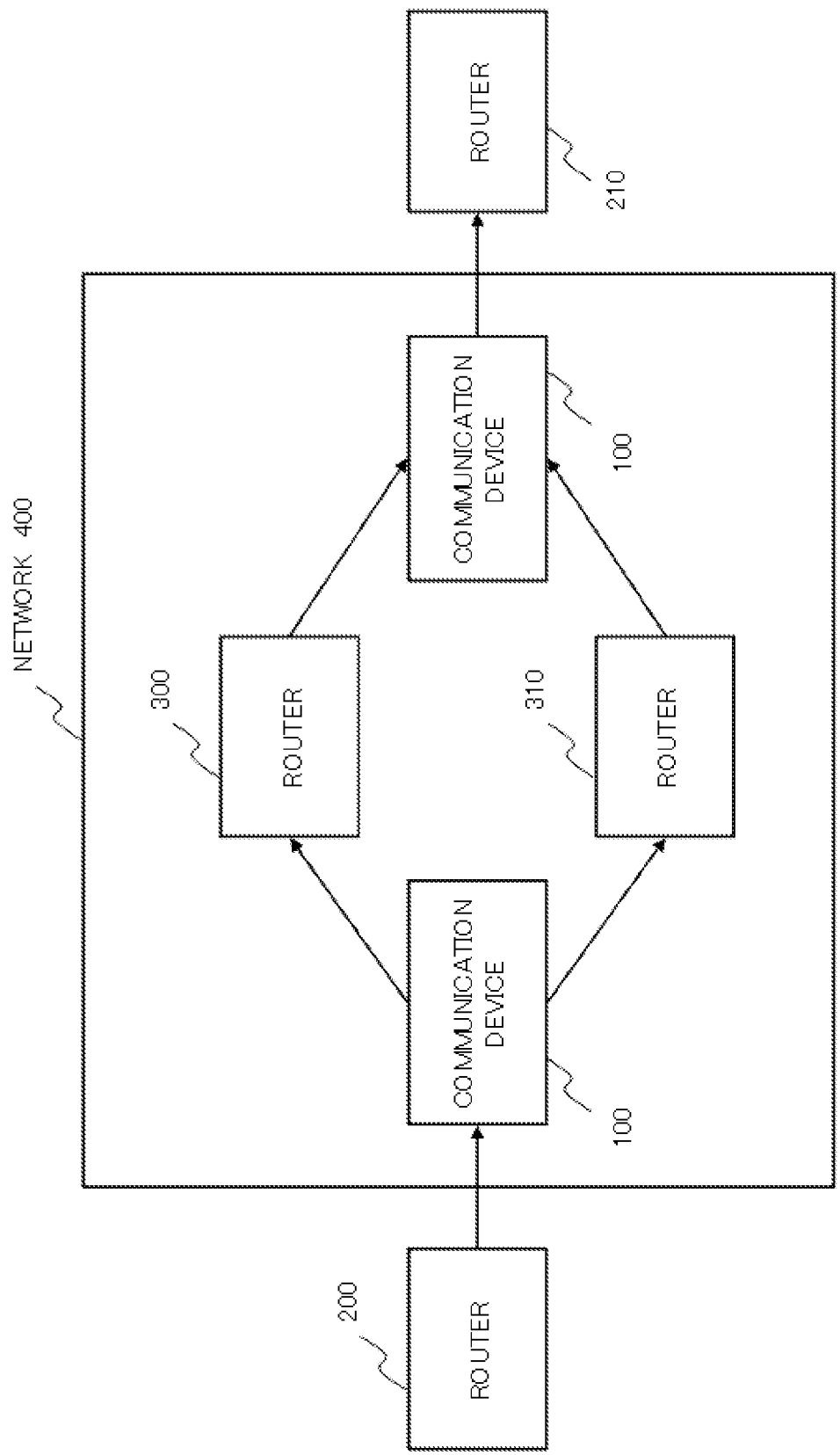
FIG. 3 is a diagram showing a configuration of a network according to a second exemplary embodiment.

FIG. 3 shows a configuration of a network according to a second exemplary embodiment. According to FIG. 3, a network 400 according to the second exemplary embodiment connects with routers 200 and 210. Hereinafter, description will be given assuming that the network 400 is an OTN described above.

The routers 200 and 210 are common routers, and they communicate with the network 400. The routers 200 and 210 belong to respective networks which each adopt communication methods different from that of the network 400. In FIG. 3, shown is a case where communication is performed from the router 200 to the router 210 via the network 400, as an example. However, communication in the reverse direction is also possible.

The network 400 includes two of a communication device 100, and routers 300 and 310. The routers 300 and 310 each are common routers, and they communicate with the communication devices 100. Here, the number of routers is set at two in FIG. 3, but it may be three or more.

In the network 400, the communication devices 100 of the same configuration are installed at respective connection points (edges) with external networks. Hereinafter, this communication device 100 will be described in detail.

Figure 4:
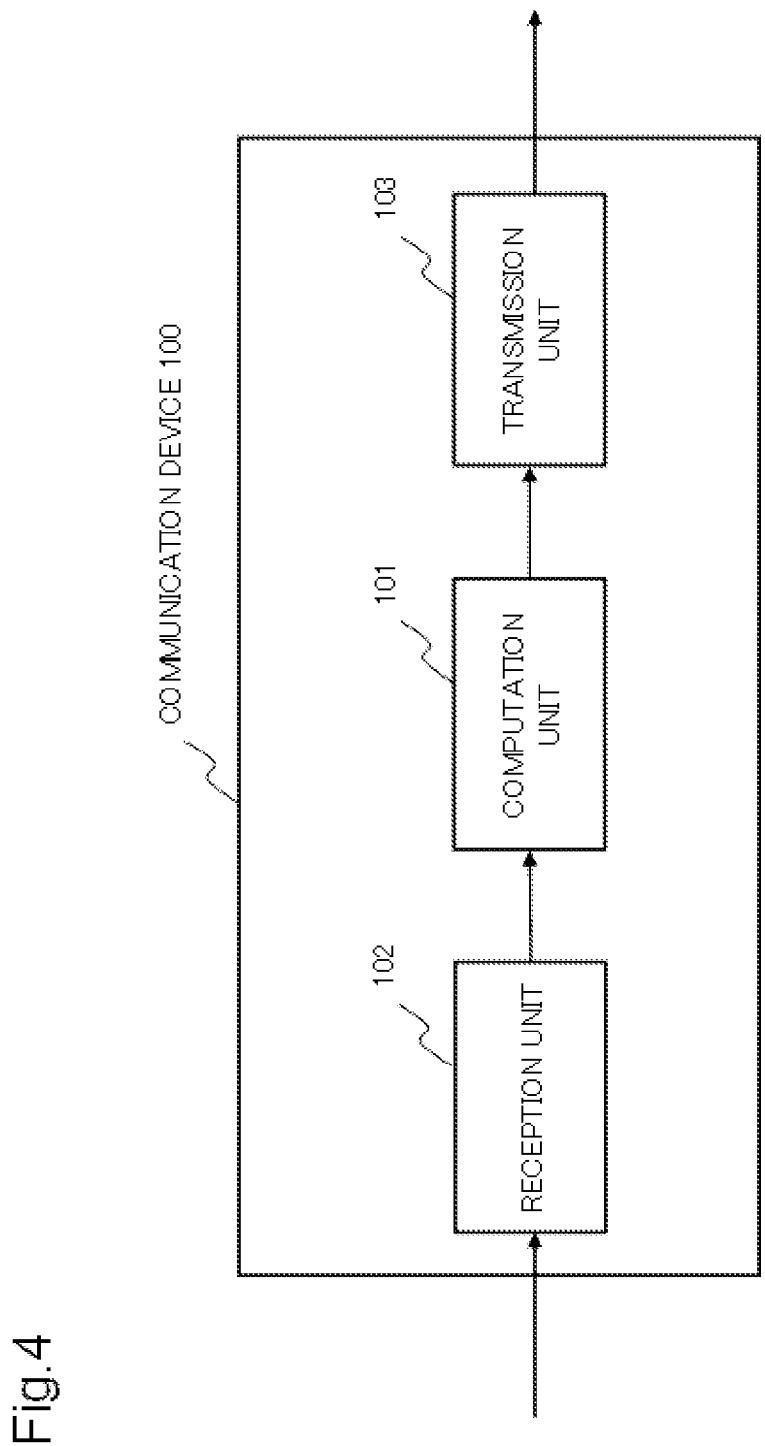
FIG. 4 is a diagram showing a configuration of a communication device according to the second exemplary embodiment.

FIG. 4 shows a configuration of the communication device 100. According to FIG. 4, the communication device 100 includes a computation unit 101, a reception unit 102 and a transmission unit 103. Operation of the communication device 100 can be separated into that of when receiving a signal from an external network and that of when sending a signal to an external network. In the following, both of the cases will be described separately. Hereafter, when the term "signal" is used just being described as "signal" without being given any particular definition, description will be given assuming that the "signal" includes an above-described OPU frame, SDH frame or the like.

When Receiving a Signal from an External Network

The reception unit 102 receives a signal from an external network. At that time, calculated is the maximum value (Pm_server) of payload block number for an OPU frame corresponding to the received frame, and also the number of data blocks (Cm(t)) is calculated from the received signal. Pm_server can be also expressed as the number of data blocks which can be contained in the OPU frame. Further, Cm(t) can be also expressed as the number of data blocks which are to be contained into the OPU frame from the received signal.

The computation unit 101 maps the received signal into the payload of the OPU frame. Specifically, it determines to insert whether client data or stuff with respect to each data block of the payload of the OPU frame. Details of the computation unit 101 will be described later.

The transmission unit 103 performs mapping of the received signal into the payload of the OPU frame in accordance with the determination made by the computation unit 101. After performing the mapping, the transmission unit 103 transmits the OPU frame to another router (the routers 300 or 310) in the network 400.

When Transmitting a Signal to an External Network

The reception unit 102 receives an OPU frame from another router (the routers 300 or 310) in the network 400. At the same time, the reception unit 102 acquires Pm_server and Cm(t) from the OH of the OPU frame.

The computation unit 101 judges which one of client data and stuff is inserted with respect to each data block of the payload of the OPU frame.

The transmission unit 103 reproduces client data from the payload of the OPU frame. Subsequently, the transmission unit 103 transmits the reproduced signal to a router (the router 210) outside the network 400.

Configuration and Operation of the Computation Unit 101

Figure 5:
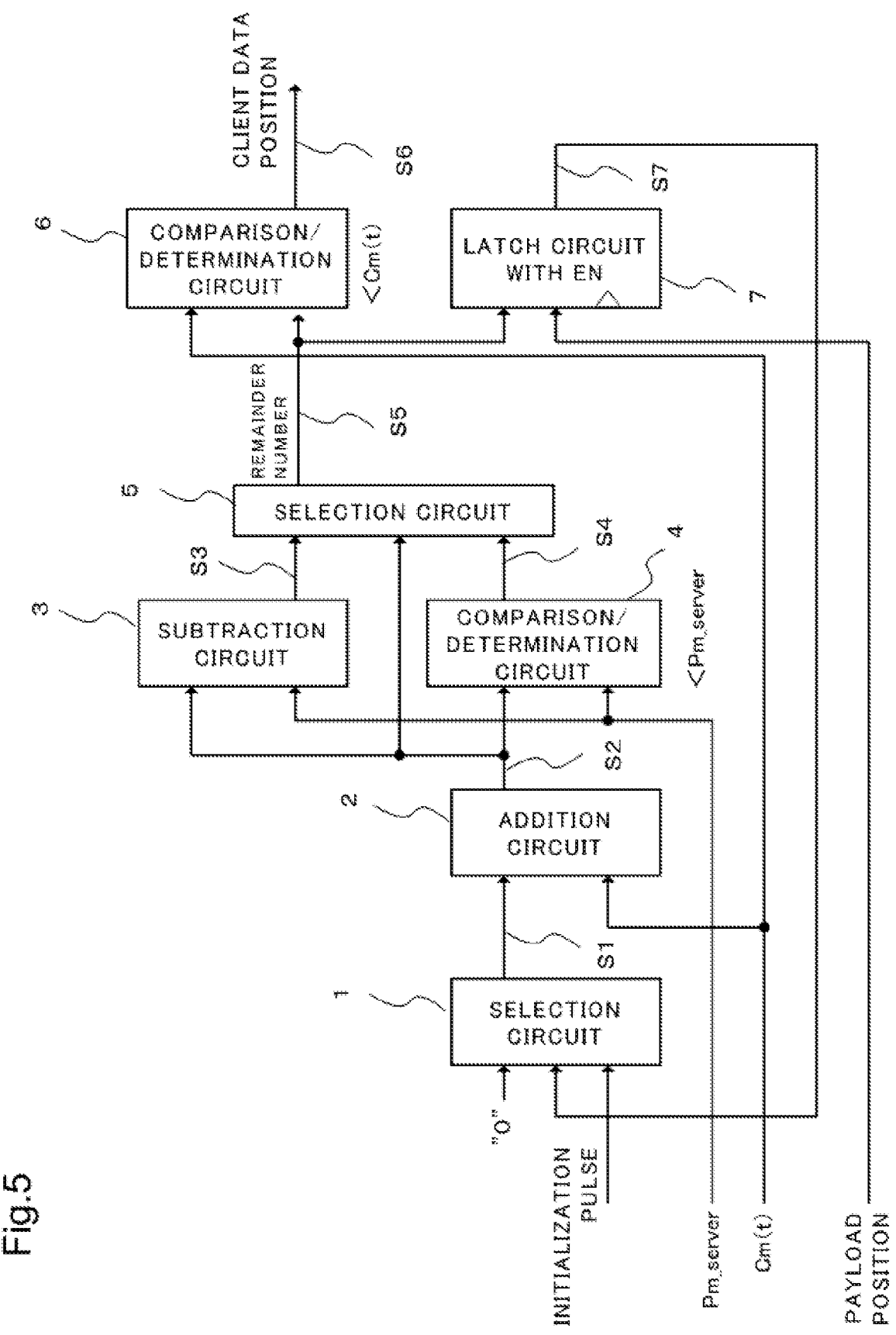
FIG. 5 is a diagram showing a configuration of a computation unit according to the second exemplary embodiment.

Next, a configuration and operation of the computation unit 101 will be described. FIG. 5 shows a configuration of the computation unit 101. According to FIG. 5, the computation unit 101 includes a selection circuit 1, an addition circuit 2, a subtraction circuit 3, a comparison/determination circuit 4, a selection circuit 5, a comparison/determination circuit 6 and a latch circuit with EN (enable) 7.

Figure 6:
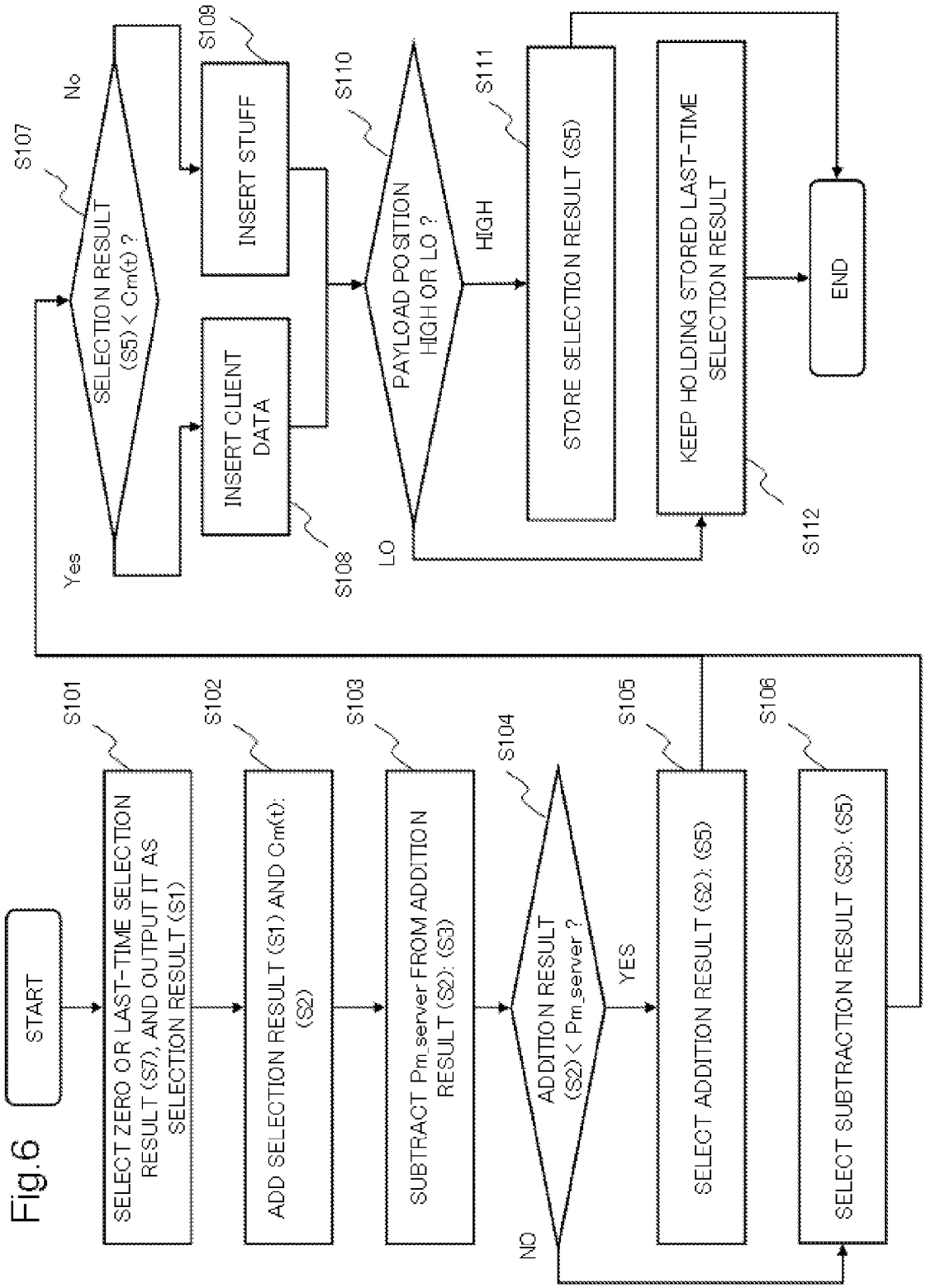
FIG. 6 is a flow chart showing operation according to the second exemplary embodiment.

FIG. 6 is a flow chart showing operation of the computation unit 101. Hereinafter, operation of the computation unit 101 will be described with reference to FIG. 6.

The operation of the computation unit 101 is almost the same for both when receiving a signal from an external network and when transmitting a signal to an external network. Therefore, description will be given below of both of the cases as a whole.

First, when an initialization pulse is "Lo", the selection circuit 1 selects the value "zero". When the initialization pulse is "High", the selection circuit 1 selects a latch with EN result (S7) (S101). The selection circuit 1 outputs either of the selection results (S1) to an addition circuit 2.

Here, the initialization pulse is a control signal which becomes "Lo" when j=1 (the payload block number is 1). This control signal is a signal used for initializing and starting computation from the head block number of an OPU frame, A selection result (S1) and Cm(t) are inputted to the addition circuit 2. The addition circuit 2 adds the selection result (S1) and Cm(t) (S102). The addition circuit 2 outputs the addition result (S2) to the subtraction circuit 3 and the comparison/determination circuit 4.

The addition result (S2) and Pm_server are inputted to the subtraction circuit 3. Subtracting Pm_server from the addition result (S2), the subtraction circuit 3 obtains a subtraction result (S3) (S103). The subtraction circuit 3 outputs the subtraction result (S3) to the selection circuit 5.

The addition result (S2) and Pm_server are inputted to the comparison/determination circuit 4. The comparison/determination circuit 4 compares the addition result (S2) with Pm_server (S104). When the addition result (S2) is smaller than Pm_server, the comparison/determination circuit 4 sets a comparison result (S4) as "High" and outputs it. On the other hand, when the addition result (S2) is equal to or larger than Pm_server, the comparison/determination circuit 4 sets the comparison result (S4) as "Lo" and outputs it.

Subsequently, to the selection circuit 5, inputted are the addition result (S2), the subtraction result (S3) and the comparison result (S4). When the comparison result (S4) is "High", the selection circuit 5 selects the addition result (S2) (S105). When the comparison result (S4) is "Lo", the selection circuit 5 selects the subtraction result (S3) (S106). The selection circuit 5 outputs either of the selection results (S5) to the comparison/determination circuit 6 and the latch circuit with EN 7. The selection result (S5) at that time becomes a remainder number (mod).

The selection result (S5) and Cm(t) are inputted to the comparison/determination circuit 6. The comparison/determination circuit 6 compares the inputted selection result (S5) with the inputted Cm(t) (S107). When the selection result (S5) is smaller than Cm(t), the comparison/determination circuit 6 sets a comparison result (S6) as "High" and outputs it. When the selection result (S5) is equal to or larger than Cm(t), the comparison/determination circuit 6 sets the comparison result (S6) as "Lo" and outputs it.

After that, in the case of receiving a signal from an external network, the operation is continued as follows in the computation unit 101.

When the comparison result (S6) is "High", the comparison/determination circuit 6 generates information for controlling to insert client data (S108). When the comparison result (S6) is "Lo", the comparison/determination circuit 6 generates control information for inserting stuff (S109). The comparison/determination circuit 6 outputs a client data position signal including either of the two kinds of control information.

In the case of transmitting a signal to an external network, the operation is continued as follows in the computation unit 101.

When the comparison result (S6) is "High", the comparison/determination circuit 6 generates information indicating that client data is inserted (S108). When the comparison result (S6) is "Lo", the comparison/determination circuit 6 generates information indicating that stuff is inserted (S109). The comparison/determination circuit 6 judges which one of client data and stuff is inserted, and outputs the result in the form of a control signal to cause the transmission unit 103 to make reproduction.

The selection result (S5) and a payload position signal are inputted to the latch circuit with EN 7 (S110). The payload position signal is a signal which becomes "High" and "Lo" respectively when a block presently subjected to the mapping is in the payload area and when it is in the OH area or in the fixed stuff area.

When the payload position signal is "High", the latch circuit with EN 7 takes in and stores the selection result (S5) (S111). When the payload position signal is "Lo", the latch circuit with EN 7 keeps holding a value stored last time and generates a value to be used in the next time slot (S112).

Figure 7:
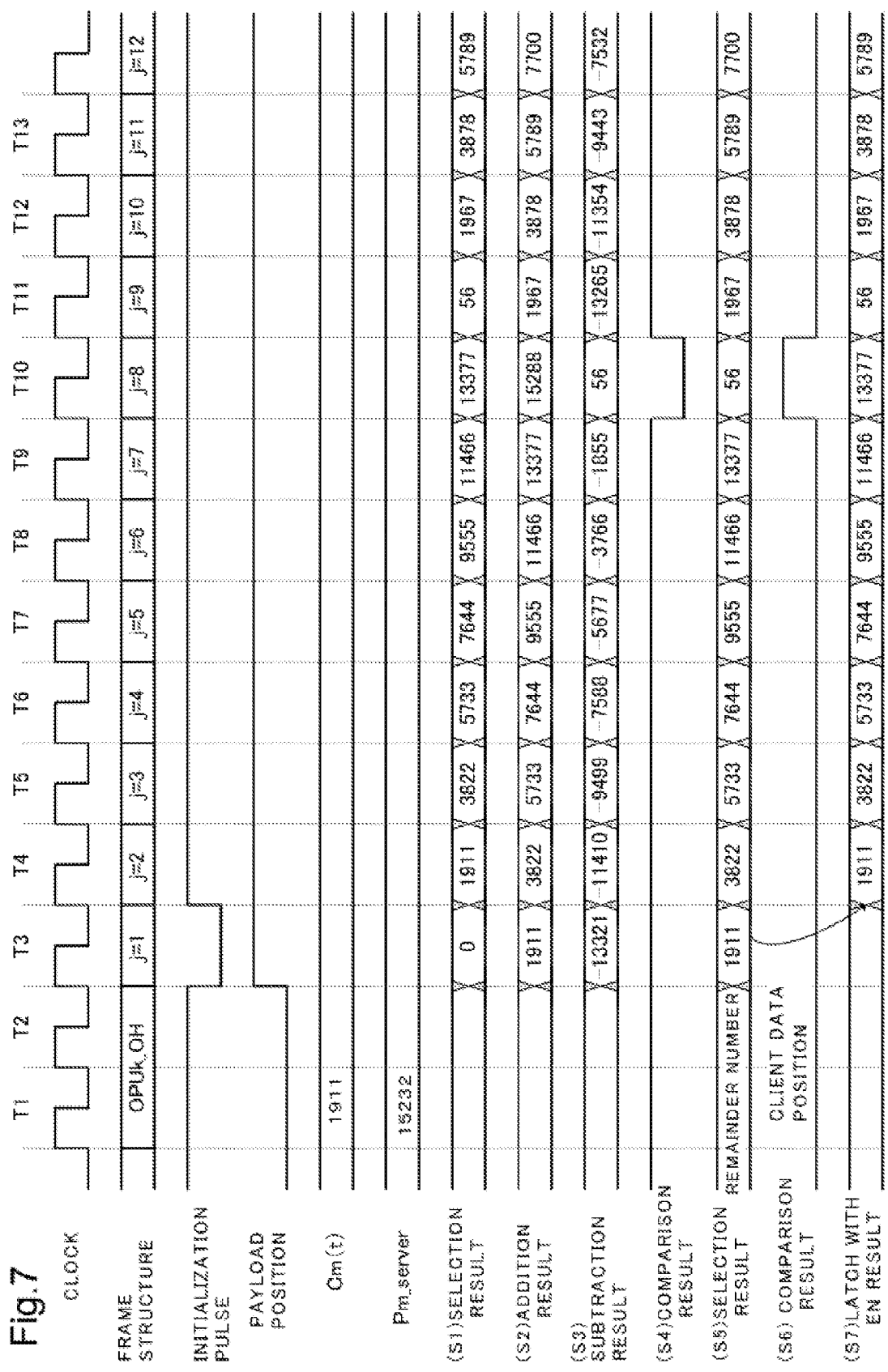
FIG. 7 is a time chart showing operation according to the second exemplary embodiment.
Figure 11:
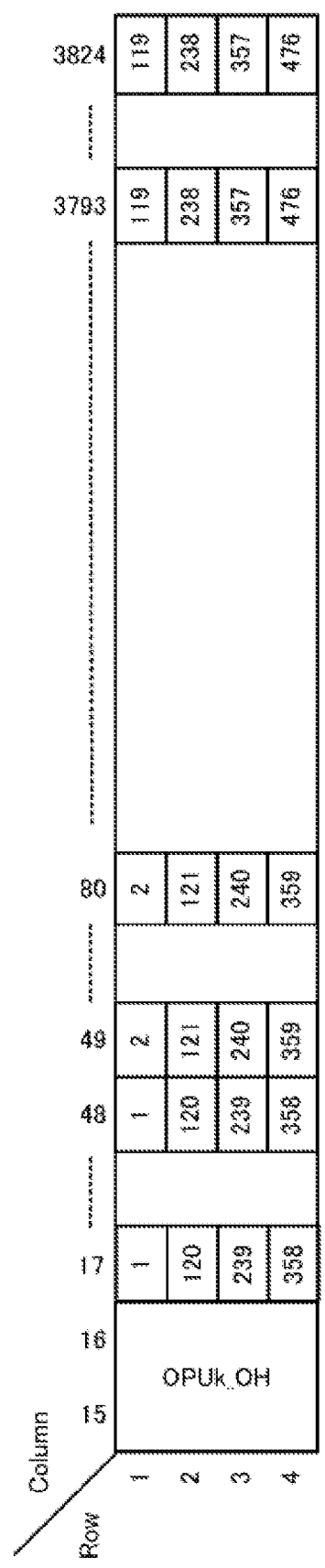
FIG. 11 is a diagram showing a structure of an OPU3 frame.
Figure 13:
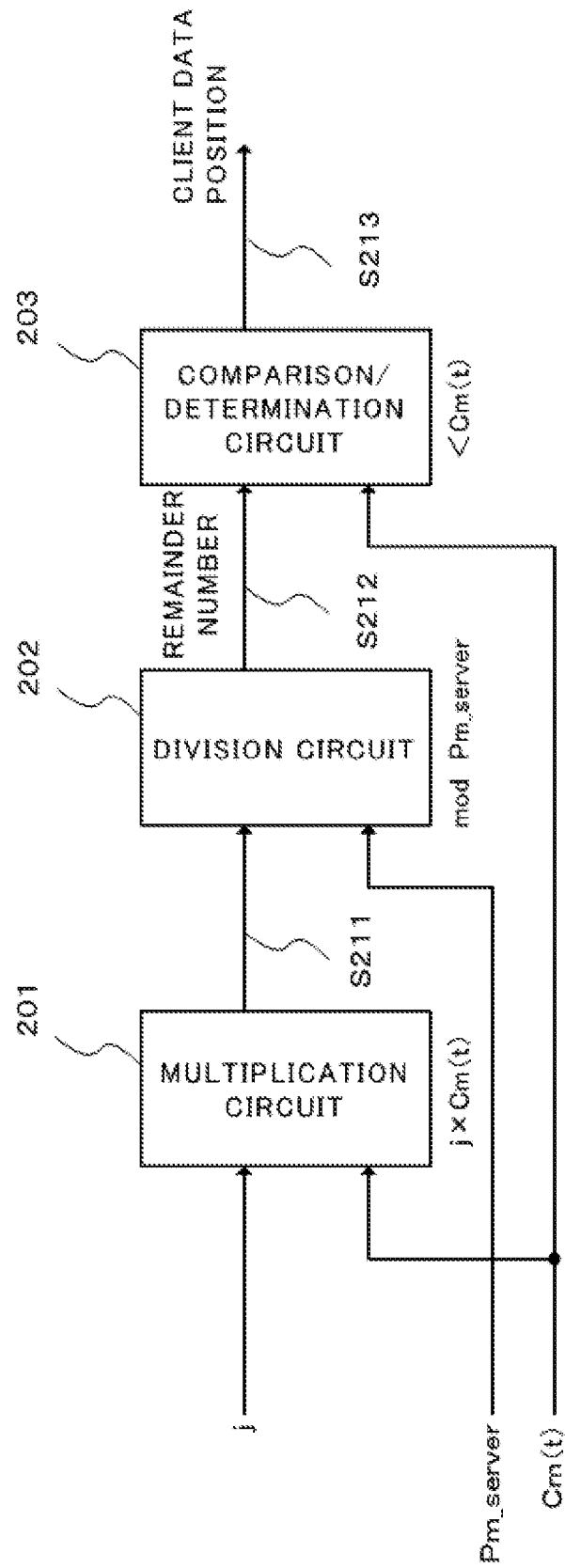
FIG. 13 is a diagram showing a circuit configuration according to a background technology.

Next, operation of the second exemplary embodiment will be described using a specific example. FIG. 7 is a time chart showing operation of when mapping an STM-1 (Synchronous Transport Module level-1) signal used in SDH into the payload of an OPU0 frame.

The values of Pm_server and Cm(t) of an OPUk frame are each described in ITU-T G.709. For an OPU0 frame, Pm_server is 15232. For a mapping of an STM-1 signal into the payload of an OPU0 frame, Cm(t) is within a range of 1911-1913.

The structure of an OPU0 frame is shown in FIG. 8. As described above, the maximum value of a payload block number of the OPU0 frame is 15232. Hereinafter, description will be given of the case when an STM-1 signal is mapped into the payload of the OPU0 frame in FIG. 8.

The following description will be given by taking as an example the case where Pm_server=15232 and Cm(t)=1911 in FIG. 7.

First, referring to the time chart shown in FIG. 7, when the clock is T1 and T2, because a position to map data of the STM-1 frame is a position in the OPUk_OH, no computation is carried out.

From the clock T3, the payload block number increases as j=1, 2, 3. First, operation in the case of the clock T3, that is, j=1, will be described below.

As j=1, an initialization pulse becomes "Lo", and thus the selection circuit 1 selects "zero". Accordingly, a selection result (S1) becomes "zero".

The addition circuit 2 adds the selection result (S1) and Cm(t) and obtain an addition result (S2) as 0+1911=1911.

As the subtraction circuit 3 subtracts Pm_server from the addition result (S2), it obtains a subtraction result (S3) as 1911−15232=−13321.

The comparison/determination circuit 4 compares the addition result (S2) with Pm_server and, because 1911<15232, outputs "High" as a comparison result (S4).

As the comparison result (S4) is "High", the selection circuit 5 selects the addition result (S2). Accordingly, the selection result (S5) becomes 1911.

The comparison/determination circuit 6 compares the selection result (S5) with Cm(t), which results in 1911=1911. Accordingly, the comparison result (S6) becomes "Lo".

As the payload position signal is "High", the latch circuit with EN 7 takes in the selection result (S5) on the rise of the clock. The latch with EN result (S7) taken in becomes 1911 and is used in the next time slot.

As the comparison result (S6) is "Lo", T3 becomes control information for inserting stuff, which is outputted as a client data position signal.

Next, operation in the case of the clock T4, that is, j=2, will be described below.

As j=2, the initialization pulse becomes "High", and thus the selection circuit 1 selects the latch with EN result (S7). Accordingly, the selection result (S1) becomes 1911.

The addition circuit 2 adds the selection result (S1) and Cm(t) and obtains an addition result (S2) as 1911+1911=3822.

As the subtraction circuit 3 subtracts Pm_server from the addition result (S2), it obtains a subtraction result (S3) as 3822−15232=−11410.

The comparison/determination circuit 4 compares the addition result (S2) with Pm_server and, because 3822<15232, outputs "High" as a comparison result (S4).

As the comparison result (S4) is "High", the selection circuit 5 selects the addition result (S2). Accordingly, the selection result (S5) becomes 3822.

The comparison/determination circuit 6 compares the selection result (S5) with Cm(t), which results in 3822>1911. Accordingly, the comparison result (S6) becomes "Lo".

As the payload position signal is "High", the latch circuit with EN 7 takes in the selection result (S5) on the rise of the clock. The latch with EN result (S7) taken in becomes 3822, and is used in the next time slot.

As the comparison result (S6) is "Lo", T4 becomes control information for inserting stuff, which is outputted as a client data position signal.

Next, operation in the case of the clock T10, that is, j=8, will be described below.

As j=8, the initialization pulse becomes "High", and the selection circuit 1 selects the latch with EN result (S7). Accordingly, the selection result (S1) becomes 13377.

The addition circuit 2 adds the selection result (S1) and Cm(t) and obtains an addition result (S2) as 13377+1911=15288.

As the subtraction circuit 3 subtracts Pm_server from the addition result (S2), it obtains a subtraction result (S3) as 15288−15232=56.

The comparison/determination circuit 4 compares the addition result (S2) with Pm_server and, because 15288>15232, outputs "Lo" as a comparison result (S4).

As the comparison result (S4) is "Lo", the selection circuit 5 selects the subtraction result (S3). Accordingly, the selection result (S5) becomes 56.

The comparison/determination circuit 6 compares the selection result (S5) with Cm(t). As 56<1911, the comparison result (S6) becomes "High".

As the payload position signal is "High", the latch circuit with EN 7 takes in the selection result (S5) on the rise of the clock. The latch with EN result (S7) taken in becomes 56, and is used in the next time slot.

As the comparison result (S6) is "High", T10 becomes control information for inserting client data, which is outputted as client data position signal.

Here, shown below are the results of calculating remainder numbers by the use of the GMP method described in Japanese Patent Application Laid-Open No. 2010-212890 or the like.

As described above in the Background Art section, the following operational expressions are used in the GMP method.

client data (D) if (j×Cm(t)) mod Pm_server<Cm(t);
stuff (S) if (j×Cm(t)) mod Pm_server>=Cm(t).
When j=1, (1×1911)÷15232=0 remainder "1911".
When j=2, (2×1911)÷15232=0 remainder "3822".
When j=8, (8×1911)÷15232=1 remainder "56".

It is noticed that, in all of the cases of j=1, 2 and 8, the calculated results described above are in accordance with the selection results (S5) in the time chart shown in FIG. 7.

Other Examples

While, with respect to the second exemplary embodiment, description has been given of mapping of a signal received from an external network into the payload of an OPU0 frame, it is not limited thereto. The second exemplary embodiment can be applied also with respect to OPU1, OPU2, OPU3, OPU4, or other signals and data frames.

FIGS. 9, 10, 11 and 12 show frame structures of an OPU1, OPU2, OPU3 and OPU4, respectively.

Further, while, with respect to the second exemplary embodiment, description has been given taking as an example the STM-1 signal of SDH, as a signal to receive from an external network, it is not limited thereto. The second exemplary embodiment can be applied, for example, even with respect to STM-4, STM-16 and STM-64 signals of SDH and an Ethernet frame and the like.

Advantageous Effect

According to the second exemplary embodiment, the computation unit 101 includes one circuit for each of addition and subtraction, which are the addition circuit 2 and the subtraction circuit 3, respectively. On the basis of results of addition/subtraction by the addition circuit 2 and the subtraction circuit 3, the computation unit 101 determines whether a type of data to be contained into the payload of an OPU frame is client data or stuff.

Therefore, according to the second exemplary embodiment, without performing any multiplication or division, the communication device 100 including the computation unit 101 can perform data mapping from a signal of an external network, which it received, into the payload of an OPU frame. In a similar way, according to the second exemplary embodiment, client data is reproduced from the payload of an OPU frame without performing any multiplication or division.

Accordingly, reduction of the circuit scale becomes possible. Moreover, reduction of power consumption of the communication device 100 is also possible.

With respect to the communication devices according to the exemplary embodiments described above, the functions they have can be realized either by hardware or by a computer and a program executed thereon. The program is provided being recorded in a recording medium such as a magnetic disk and a semiconductor memory, and is read by a computer at the time of its start-up or the like. Operation of the computer is controlled in such a way, and accordingly the computer is caused to function as a device to which processes are assigned in each of the exemplary embodiments described above, and thus to execute the processes described above.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

Supplementary Note 1

A communication device comprising:
an addition unit which outputs a result of adding a predetermined number to the number of data blocks of a first signal, as an addition result;
a comparison unit which, on the basis of comparison of said addition result with the number of data blocks of a second signal to contain said first signal, outputs said addition result or a result of subtracting said number of data blocks of the second signal from said addition result, as a selection result;
a data insertion unit which, on the basis of comparison of said selection result with said number of data blocks of the first signal, inserts either of said first signal and adjustment data into said second signal; and
a storage unit which, when a data block into which said first signal or said adjustment data is to be inserted is a data area, stores said selection result, and outputs said selection result stored last time to said addition unit, as said predetermined number.

Supplementary Note 2

The communication device according to supplementary note 1, wherein:
when said addition result is smaller than said number of data blocks of the second signal, said comparison unit determines said addition result as said selection result; and
when said addition result is equal to or larger than said number of data blocks of the second signal, said comparison unit determines a result of subtracting said number of data blocks of the second signal from said addition result as said selection result.

Supplementary Note 3

The communication device according to supplementary note 1 or 2, wherein:
when said first signal is contained into the first block of said second signal, said addition unit adds zero to said number of data blocks of the first signal; and when said first signal is contained into a block of said second signal other than the first block, said addition unit adds said predetermined number to said number of data blocks of the first signal.

Supplementary Note 4

The communication device according to any one of supplementary notes 1 to 3, wherein:
when said selection result is smaller than said number of data blocks of the first signal, said data insertion unit inserts said first signal; and
when said selection result is equal to or larger than said number of data blocks of the first signal, said data insertion unit inserts adjustment data.

Supplementary Note 5

A communication system comprising:
a reception unit which receives a first signal;
an addition unit which outputs a result of adding a predetermined number to the number of data blocks of said first signal, as an addition result;
a comparison unit which, on the basis of comparison of said addition result with the number of data blocks of a second signal to contain said first signal, outputs said addition result or a result of subtracting said number of data blocks of the second signal from said addition result, as a selection result;
a data insertion unit which, on the basis of comparison of said selection result with said number of data blocks of the first signal, inserts either of said first signal and adjustment data into said second signal;
a storage unit which, when a data block into which said first signal or said adjustment data is to be inserted is a data area, stores said selection result, and outputs said selection result stored last time to said addition unit, as said predetermined number; and
a transmission unit which, on the basis of said insertion result of the data insertion unit, generates and transmits said second signal.

Supplementary Note 6

The communication system according to supplementary note 5, wherein:
when said addition result is smaller than said number of data blocks of the second signal, said comparison unit determines said addition result as said selection result; and
when said addition result is equal to or larger than said number of data blocks of the second signal, said comparison unit determines a result of subtracting said number of data blocks of the second signal from said addition result as said selection result.

Supplementary Note 7

The communication system according to supplementary note 5 or 6, wherein:
when said first signal is contained into the first block of said second signal, said addition unit adds zero to said number of data blocks of the first signal; and
when said first signal is contained into a block of said second signal other than the first block, said addition unit adds said predetermined number to said number of data blocks of the first signal.

Supplementary Note 8

The communication system according to any one of supplementary note 5 to 7, wherein:
when said selection result is smaller than said number of data blocks of the first signal, said data insertion unit inserts said first signal; and
when said selection result is equal to or larger than said number of data blocks of the first signal, said data insertion unit inserts adjustment data.

Supplementary Note 9

A communication method comprising the steps of:
outputting a result of adding a predetermined number to the number of data blocks of a first signal, as an addition result;
outputting, on the basis of comparison of said addition result with the number of data blocks of a second signal to contain said first signal, said addition result or a result of subtracting said number of data blocks of the second signal from said addition result, as a selection result;
inserting either of said first signal and adjustment data into said second signal, on the basis of comparison of said selection result with said number of data blocks of the first signal; and
storing said selection result and outputting said selection result stored last time for said adding, as said predetermined number, when a data block into which said first signal or said adjustment data is to be inserted is a data area.

Supplementary Note 10

The communication method according to supplementary note 9, wherein:
when said addition result is smaller than said number of data blocks of the second signal, said addition result is determined as said selection result; and
when said addition result is equal to or larger than said number of data blocks of the second signal, a result of subtracting said number of data blocks of the second signal from said addition result is determined as said selection result.

Supplementary Note 11

The communication method according to supplementary note 9 or 10, wherein:
when containing said first signal into the first block of said second signal, said addition result is a result of adding zero to said number of data blocks of the first signal; and
when containing said first signal into a block of said second signal other than the first block, said addition result is a result of adding said predetermined number to said number of data blocks of the first signal.

Supplementary Note 12

The communication method according to any one of supplementary notes 9 to 11, wherein:
when said selection result is smaller than said number of data blocks of the first signal, said signal to be inserted into the second signal is said first signal; and
when said selection result is equal to or larger than said number of data blocks of the first signal, said signal to be inserted into the second signal is said adjustment data.

Supplementary Note 13

A tangible and non-transitory recording medium storing a communication program for causing a computer to execute:

an addition process of outputting a result of adding a predetermined number to the number of data blocks of a first signal, as an addition result;

a comparison process of outputting, on the basis of comparison of said addition result with the number of data blocks of a second signal to contain said first signal, said addition result or a result of subtracting said number of data blocks of the second signal from said addition result, as a selection result;

a data insertion process of inserting either of said first signal and adjustment data into said second signal, on the basis of comparison of said selection result with said number of data blocks of the first signal; and a storing process of, when a data block into which said first signal or said adjustment data is to be inserted is a data area, storing said selection result and supplying said selection result stored last time to said addition process, as said predetermined number.

Supplementary Note 14

The tangible and non-transitory recording medium storing a communication program according to supplementary note 13, wherein, in said comparison process:

when said addition result is smaller than said number of data blocks of the second signal, said addition result is determined as said selection result; and when said addition result is equal to or larger than said number of data blocks of the second signal, a result of subtracting said number of data blocks of the second signal from said addition result is determined as said selection result.

Supplementary Note 15

The tangible and non-transitory recording medium storing a communications program according to supplementary note 13 or 14, wherein, in said addition process:

when containing said first signal into the first block of said second signal, zero is added to said number of data blocks of the first signal; and when containing said first signal into a block of said second signal other than the first block, said predetermined number is added to said number of data blocks of the first signal.

Supplementary Note 16

The tangible and non-transitory recording medium storing a communications program according to any one of supplementary notes 13 to 15, wherein, in said data insertion process:

when said selection result is smaller than said number of data blocks of the first signal, said first signal is inserted; and when said selection result is equal to or larger than said number of data blocks of the first signal, said adjustment data is inserted.

The invention claimed is:

1. A communication device comprising:
an addition unit which outputs a result of adding a predetermined number to a number of data blocks of a first signal, as an addition result;
a comparison unit which, on the basis of comparison of said addition result with a number of data blocks of a second signal to contain said first signal, outputs said addition result or a result of subtracting said number of data blocks of the second signal from said addition result, as a selection result;
a data insertion unit which, on the basis of comparison of said selection result with said number of data blocks of the first signal, inserts either of said first signal and adjustment data into said second signal; and
a storage unit which,
when a data block into which said first signal or said adjustment data is to be inserted is a data area, stores said selection result, and outputs said selection result stored to said addition unit by previous performance of said comparison unit, as said predetermined number,
when a data block into which said first signal or said adjustment data is to be inserted is not a data area, keeps holding said selection result stored to said addition unit by previous performance of said comparison unit.

2. The communication device according to claim 1, wherein:
when said addition result is smaller than said number of data blocks of the second signal, said comparison unit determines said addition result as said selection result; and
when said addition result is equal to or larger than said number of data blocks of the 20 second signal, said comparison unit determines a result of subtracting said number of data blocks of the second signal from said addition result as said selection result.

3. The communication device according to claim 1, wherein:
when said first signal is to be contained into a first block of said second signal, said addition unit adds zero to said number of data blocks of the first signal; and
when said first signal is to be contained into a block of said second signal other than the first block, said addition unit adds said predetermined number to said number of data blocks of the first signal.

4. The communication device according to claim 1, wherein:
when said selection result is smaller than said number of data blocks of the first signal, said data insertion unit inserts said first signal; and
when said selection result is equal to or larger than said number of data blocks of the first signal, said data insertion unit inserts adjustment data.

5. A communication system comprising:
a reception unit which receives a first signal;
an addition unit which outputs a result of adding a predetermined number to a number of data blocks of said first signal, as an addition result;
a comparison unit which, on the basis of comparison of said addition result with a number of data blocks of a second signal to contain said first signal, outputs said addition result or a result of subtracting said number of data blocks of the second signal from said addition result, as a selection result;
a data insertion unit which, on the basis of comparison of said selection result with said number of data blocks of the first signal, inserts either of said first signal and adjustment data into said second signal;
a storage unit which, when a data block into which said first signal or said adjustment data is to be inserted is a data area, stores said selection result, and outputs said selection result stored to said addition unit by previous performance of said comparison unit, as said predetermined number; and a transmission unit which, on the basis of said insertion result of the data insertion unit, generates and transmits said second signal, wherein when a data block into which said first signal or said adjustment data is to be inserted is not a data area, keeps holding said selection result stored to said addition unit by previous performance of said comparison unit.

6. The communication system according to claim 5, wherein:

when said addition result is smaller than said number of data blocks of the second signal, said comparison unit determines said addition result as said selection result; and when said addition result is equal to or larger than said number of data blocks of the second signal, said comparison unit determines a result of subtracting said number of data blocks of the second signal from said addition result as said selection result.

7. The communication system according to claim 5, wherein:

when said first signal is to be contained into a first block of said second signal, said addition unit adds zero to said number of data blocks of the first signal; and when said first signal is to be contained into a block of said second signal other than the first block, said addition unit adds said predetermined number to said number of data blocks of the first signal.

8. The communication system according to claim 5, wherein:

when said selection result is smaller than said number of data blocks of the first signal, said data insertion unit inserts said first signal; and when said selection result is equal to or larger than said number of data blocks of the first signal, said data insertion unit inserts adjustment data.

9. A communication method comprising the steps of:

outputting a result of adding a predetermined number to a number of data blocks of a first signal, as an addition result;

outputting, on the basis of comparison of said addition result with a number of data blocks of a second signal to contain said first signal, said addition result or a result of subtracting said number of data blocks of the second signal from said addition result, as a selection result;

inserting either of said first signal and adjustment data into said second signal, on the basis of comparison of said selection result with said number of data blocks of the first signal; and storing said selection result and outputting said selection result stored for said adding by a previous performance during the outputting said addition result or a result of subtracting said number of data blocks of the second signal from said addition result, as said predetermined number, when a data block into which said first signal or said adjustment data is to be inserted is a data area, wherein when a data block into which said first signal or said adjustment data is to be inserted is not a data area, keeps holding said selection result stored to said addition unit by previous performance of said comparison unit.

10. The communication method according to claim 9, wherein:

when said addition result is smaller than said number of data blocks of the second signal, said addition result is determined as said selection result; and when said addition result is equal to or larger than said number of data blocks of the second signal, a result of subtracting said number of data blocks of the second signal from said addition result is determined as said selection result.

11. The communication method according to claim 9, wherein:

when said first signal is to be contained into a first block of said second signal, said addition result is a result of adding zero to said number of data blocks of the first signal; and when said first signal is to be contained into a block of said second signal other than the first block, said addition result is a result of adding said predetermined number to said number of data blocks of the first signal.

12. The communication method according to claim 9, wherein:

when said selection result is smaller than said number of data blocks of the first signal, said signal to be inserted into the second signal is said first signal; and when said selection result is equal to or larger than said number of data blocks of the first signal, said signal to be inserted into the second signal is said adjustment data.

* * * * *